Patented Jan. 7, 1936

2,027,339

UNITED STATES PATENT OFFICE 2,027,339

MANUFACTURE OF VARNISH RESINS, VARNISHES, AND LIKE COATING COMPOSITIONS

Adolf Heck, Kansas City, Mo., assignor to Cook Paint & Varnish Company, Kansas City, Mo., a corporation of Delaware No Drawing. Application June 25, 1935, Serial No. 28,354

12 Claims. (Cl. 260—8)

This invention relates to the manufacture of varnish resins, varnishes and like coating compositions; and it comprises methods of making the same wherein a phenol is condensed with a polybasic acid and partially resinified, and the product is esterified with a polybasic alcohol and with a resin acid, such as rosin, the esterified resin being sometimes combined with a drying oil; and it further comprises the resins, the varnish bases and the varnishes obtained by dissolving the resin or the base in volatile solvents; all as more fully hereinafter set forth and as claimed.

In my prior applications Ser. Nos. 526,568 and 586,467 filed March 30, 1931 and January 13, 1932 respectively, I have described processes of making new resins from partially resinified complex phenol-phthalic anhydrid condensation products, and various compositions containing these new resins. In these processes, a phenol is condensed with phthalic anhydrid and the condensation products is partially resinified. The partially resinified condensation product is then reacted with certain reagents to form modified and more complex resins useful for various purposes.

This application is in part a division and in part a continuation of the said prior applications. It is directed to methods of making particular varnish resins and the new varnishes obtainable from them.

In the present invention, a partially resinified complex phenol-phthalic anhydrid condensation product is esterified with glycerine and with rosin or other acid resin, the reaction mixture being heated to 200° C. or higher until a varnish resin of the desired properties is obtained.

The partially resinified phenol-phthalic anhydrid condensation product may be prepared as described in my said prior applications. Such products contain hydroxyl and carboxyl groups, both of which are reactive. They are readily esterified and resinified by the present processes, yielding new resins of great complexity and high molecular weight.

The resins obtained are of a new type and have a combination of properties particularly useful in making varnishes for a variety of purposes. They have a wide range of solubility, dissolving in large proportions in most of the ordinary volatile solvents to give clear and uniform solutions. The resins are of homogeneous and unitary character.

In preparing the varnishes, the stated materials are processed by a correlated series of steps to obtain an improved product.

The phenol is condensed with the phthalic anhydrid in the presence of a catalyst, ordinarily aluminum chlorid; about 2 mols of phenol being condensed with 1 mol. of phthalic anhydrid.

Advantageously, the phenol is heated and the phthalic anhydrid is added to the molten phenol. When a homogeneous solution is obtained, a catalyst is slowly added. With aluminum chlorid, the temperature rises to about 130° C. because of vigorous reaction. After the reaction is complete, the product is held at about 120° C. until a partially resinified material is obtained.

The partially resinified product is esterified with glycerin and with resin acids, the mixture being admixed with these bodies and heated until esterification and the desired amount of resinification have been obtained. One advantageous procedure is to heat an acid resin, for instance rosin, until it is molten and add to it the described partially resinified product. The molten mixture is stirred until homogeneous and the necessary amount of glycerin is gradually added to the hot mixture. After adding the glycerin, heating is continued at a slightly higher temperature until a fargoing esterification is effected and a resin of the desired properties is obtained. When a sample cooled to room temperature shows the desired consistency, hardness, etc., the heating is stopped.

The resins so obtained are non-tacky, unitary and homogeneous materials of high molecular weight, indicating a complex molecular structure. They are, nevertheless, readily soluble in large proportions in the usual varnish solvents. They are soluble in and miscible with the drying oils. They are also soluble in esters, ketones, coal tar hydrocarbons, turpentine, mineral spirits and varnish solvents containing mineral spirits.

Dissolved in varnish solvents, excellent varnishes are obtained which yield coatings rapidly air drying to hard, non-tacky films.

By varying the proportions of the materials, the temperatures and the times of heating, resins having special properties may be prepared. Excellent resins may be prepared with proportions of the reactants within the following range:

| | Parts |
|---|---|
| Phenol-phthalic anhydrid condensation products | 100 |
| Rosin or other resin acid | 100 to 900 |
| Glycerin or other polyhydric alcohol | 22 to 100 |

The described resins give excellent varnishes of the "spirit varnish" type without any admixture; solutions in the ordinary volatile solvents drying down to good coating films. Such a varnish may be pigmented with the usual pigments in the usual way.

Because of their solubility in and miscibility with drying oils, some of the new resins may be usefully employed in varnishes of the oil varnish type. In making blended varnishes containing a drying oil, such as linseed oil, perilla oil, tung oil, etc., it is advantageous to pre-heat the oil to about 200° C., add the new resin and stir. It is advantageous to continue cooking at temperatures between 230° and 240° C. until a cooled sample shows a thickened consistency of the desired order. After cooling, the compound varnish base thus prepared may be thinned with the usual thinners, including petroleum spirits, to make a varnish of the desired consistency.

In making the phenol-phthalic anhydrid condensation product, other phenols and other dibasic aromatic acids may be used in lieu of phenol itself and of phthalic anhydrid. The phthalic anhydrid may be replaced with phthalic acid or by another suitable polybasic carboxylic acid. The carbolic acid (phenol) may be replaced with a cresol or a xylenol. In lieu of aluminum chlorid as a catalyst, other condensing catalysts may be used, such as tin chlorids, ferric chlorid, etc. As stated in my copending application Ser. No. 526,568, zinc chlorid may be used as the catalyst. In other words, in my present processes, the condensation catalyst used in making the phenol-polybasic acid condensation product may be a catalyst of the class consisting of the chlorids of aluminum, iron, tin and zinc.

The partially resinified phenol-phthalic anhydrid condensation products made as described are of rather indefinite and complex constitution, but probably contain, among other things, para-dioxytriphenyl-carbinol-o-carboxylic acid or a lactone of that compound or, and probably, both the acid and the lactone. Their exact nature is not here material, it being sufficient that they are useful for the present purposes; being convertible into new and valuable varnish resins.

In converting the partially resinified condensation products into varnish resins by the present processes, certain modifications may be used. As the condensation products contain both hydroxyl and carboxylic groups capable of esterification, various acids and polyhydric alcohols may be added to react therewith and to form new resinous complexes. Sometimes, in lieu of glycerin, other polyhydric alcohols, such as glycol, etc., may be used. Glycerin is satisfactory for most purposes and has certain advantages. Usually the amounts of resin acid and glycerin added are sufficient to produce a substantially neutral end product.

In lieu of rosin or abietic acid, other resin acids and resinous materials which are somewhat acid may be used. Resin acids from soft manilla copal are advantageous.

An excess of acid and of glycerin may be used over the calculated amounts and there is advantage in this in making neutral products. The excess becomes combined during the process to form resinous esters. The character of the product is somewhat modified thereby.

In making certain special resins, fatty acids, particularly those of drying oils, may be used in conjunction with and in addition to the resin acid. When drying oil acids are used in additon to the resin acid the resins obtained are somewhat more plastic in consistency and are more oily. The drying qualities of the ultimate varnishes are enhanced.

The following examples, in which the parts are parts by weight, illustrate certain embodiments of this invention.

Example 1

Approximately two molecules of ordinary phenol ($C_6H_5OH$) are reacted with 1 molecule of phthalic anhydrid in the presence of freshly sublimed aluminum chlorid as a catalyst. In so doing, 190 parts of phenol are heated to a temperature of 80 to 90° C. and then 148 parts of phthalic anhydrid mixed in. After homogeneous solution is obtained, 10 to 50 parts of aluminum chlorid are slowly added. A violent reaction occurs and the temperature rises to about 120 to 130° C. After completion of this initial reaction, the mixture is held at 120° C. until a gelatinous mass is obtained. Approximately two hours are required.

In the above example, cresol may be used in lieu of the phenol. Likewise, the phthalic anhydrid may be replaced with phthalic acid or with another polybasic carboxylic acid of cyclic structure.

Example 2

Into a suitable varnish kettle there is charged 400 parts of rosin. The rosin is heated to a temperature of 200° C. in approximately 1 hour and 30 minutes. Then 100 parts of the condensation product obtained in Example 1 are added to the molten rosin. The hot mixture is stirred until uniform and homogeneous. Then the temperature is gradually raised to 250° C. in about four hours and during this period 90 parts of glycerin are gradually added. The heating is continued at about 250° C. until, upon cooling, a clear, hard resin is obtained. About two to three hours are usually sufficient to esterify the added glycerin and obtain such a resin.

The resin so obtained is a hard, brittle, non-tacky material. It has a melting point between 110–120° C. It is soluble in turpentine, in coal tar hydrocarbons, in esters, in ketones and in drying oils. When dissolved in about an equal weight of any of the usual varnish solvents, a satisfactory varnish is obtained.

This resin is miscible with nitrocellulose lacquers and may be combined with nitrocellulose solutions to produce improved lacquers for furniture, etc.

Example 3

The hard soluble resin obtained in Example 2 may be cut with toluene to a 50 per cent solution. The solution so obtained is itself directly useful as a varnish. It may be blended with nitrocellulose solutions to make furniture lacquers. For instance, 16 parts of the said toluene solution may be added to 84 parts of a nitrocellulose solution having the following composition:

| | Parts |
|---|---|
| "Half-second" cotton | 11 |
| Dibutylphthalate | 4 |
| Ethylacetate | 14 |
| Butylacetate | 19 |
| Butanol | 6 |
| Toluene | 46 |

Example 4

The resin from Example 2 and China-wood oil in the ratio of 160 parts of oil and 50 parts of resin are heated to a temperature of 220° C. and held at that temperature for 15 minutes. Then an addition of 50 parts of resin is made and the mixture stirred until the resin is all dissolved.

The reaction mixture which cools somewhat is reheated to a temperature of 230 to 240° C. and held at that temperature until the varnish base shows a "short string". This varnish base is partially cooled and reduced with mineral spirits and turpentine. About 250 parts of a mixture containing mineral spirits and turpentine in the ratio of 90 to 10 is sufficient to reduce this varnish base and yield a good varnish.

*Example 5*

Another good resin may be formed by esterifying 100 parts of the condensation product from Example 1 with 400 parts of "run" congo and 50 parts of glycerin. Esterification is effected in the manner set forth in Example 2. After 6 hours of heating, a brown soluble resin is obtained.

This resin is soluble in terpenes, esters, ketones and drying oils. It is also soluble in aromatic hydrocarbons, such as benzol.

*Example 6*

The resin obtained in Example 5 may be combined with linseed oil to give a good varnish base. In combining the oil and resin, 100 parts of linseed oil or other drying oil are heated to 200° C. and then 100 parts of the resin of Example 5 are added. The heating is continued at about 250° C., or slightly above, until the oil and resin have combined to give a varnish base of good consistency. About two hours is required. The varnish base is cooled to about 150° C. and 200 parts of oil of turpentine or other thinner are added.

To obtain a rapidly drying varnish, a drier, such as cobalt acetate, may be added during the cooking procedure or liquid drier may be added to the varnish.

Other embodiments of the present invention may be used in lieu of the embodiments given ante in producing commercial varnishes and coating compositions. The varnishes may be compounded with various dyes, pigments, etc., to obtain enamels. For instance, carbon black may be added as a pigment in the production of black enamels.

What I claim is:—

1. In the manufacture of varnishes, the improved process which comprises condensing 2 mols of a phenol with 1 mol. of a polybasic aromatic carboxylic acid in the presence of a condensing catalyst of the class consisting of the chlorids of aluminum, iron, tin and zinc, heating the condensation product to partially resinify it, fusing 100 parts of said partially resinified condensation product with about 400 parts of a rosin, adding sufficient polyhydric alcohol to esterify the molten material, heating the reaction mixture until the materials are mutually esterified and further resinification is effected, the heating being continued until a clear, substantially neutral, hard resin is obtained upon cooling, said resin so obtained being soluble in coal tar hydrocarbons, mineral spirits and drying oils.

2. As an improved varnish, a varnish comprising a 50 per cent solution in a varnish solvent of the resin obtained by the process of claim 1.

3. In the manufacture of improved varnishes, the improvement which comprises condensing about 2 mols of a phenol with 1 mol. of an anhydrid of an aromatic dicarboxylic acid in the presence of an inorganic catalyst of the class consisting of the chlorids of aluminum, iron, tin and zinc, to form a phenol-polybasic acid condensation product, separately fusing a natural resin acid, adding the said phenol-polybasic acid condensation product to the molten resin acid, heating the mixture to about 250° C. until it becomes uniform and homogeneous, gradually adding a polyhydric alcohol to the hot mixture and then continuing the heating at said temperature until a clear, non-tacky resin is obtained upon cooling.

4. In the manufacture of varnish resins, the steps which comprise esterifying a phenol-phthalic anhydrid condensation product with both glycerin and rosin, said phenol-phthalic anhydrid condensation product being one obtained by condensing about two mols of phenol with one mol. of phthalic anhydrid in the presence of an inorganic catalyst of the class consisting of the chlorids of aluminum, iron, tin and zinc.

5. In the manufacture of varnishes, the steps which comprise adding an aromatic dicarboxylic acid anhydrid to a molten phenol in a molecular ratio of approximately 1:2 of anhydrid to phenol, adding aluminum chlorid to the homogeneous solution thus obtained, permitting the first violent reaction to subside and then heating the reaction mixture until the reaction is substantially complete and a gelatinous mass is obtained, to produce a phenol-polybasic acid condensation product, fusing together the said condensation product and a natural resin acid, adding to the molten mixture sufficient glycerin to esterify it, further heating the mixture until a clear, non-tacky resin is obtained and combining said clear resin so obtained with a drying oil by heating a mixture of said resin and oil to at least 200° C., until a uniform, unitary varnish base is obtained, said varnish base being soluble in coal tar hydrocarbons, mineral spirits and other varnish solvents.

6. The process of claim 5 wherein said aromatic dicarboxylic acid anhydrid is phthalic anhydrid.

7. The process of claim 5 wherein said drying oil is linseed oil.

8. The process of claim 5 wherein said varnish base is cooled and the cooled material is reduced with an equal weight of mineral spirits to obtain a quick drying varnish.

9. As an improvement in the manufacture of useful complex resins from phenols, phthalic anhydrid, glycerin and rosin, the steps which comprise heating approximately 190 parts of phenol to between 80 and 90° C., adding about 148 parts of phthalic anhydrid to the heated phenol, continuing the heating until a homogeneous solution is obtained, slowly adding between 10 to 50 parts of aluminum chlorid to the said solution, permitting the first violent reaction to subside and then heating the reaction mixture to about 120° C. until the reaction is substantially complete and recovering the condensation product thus obtained, fusing together about 100 parts of said condensation product and between 100 and 900 parts of rosin, adding to the molten mass between 22 to 100 parts of glycerin, and further heating the mixture at about 250° C. until a clear, non-tacky resin is obtained upon cooling.

10. As an improved varnish base, the non-tacky resinous ester obtained by the process of claim 5, said varnish base being a substantially neutral ester comprising a drying oil combined with a phenol-polybasic acid condensation product esterified with both a polyhydric alcohol and a natural resin acid, said varnish base being soluble in mineral spirits and other varnish solvents.

11. As an improved varnish material, the resinous esters obtained by the process of claim 4, said improved varnish material being a substantially neutral, hard, non-tacky material comprising a resinified phenol-phthalic condensation product esterified with glycerin and rosin, said material being soluble in coal tar hydrocarbons, mineral spirits and drying oils.

12. In the manufacture of varnish resins from phenols, the improvement which comprises condensing phenol with a polybasic carboxylic acid with the aid of aluminum chlorid, to produce a phenol-polybasic acid containing reactive phenolic groups and having phenol combined with the polybasic acid in approximately the molar ratio of 2:1, partially resinifying the condensation product by heating to approximately 120° C., esterifying said partially resinified condensation product with both glycerin and rosin and further resinifying the esterified material by heating to approximately 250° C. to produce an improved varnish resin uniformly soluble in a wide range of varnish solvents.

ADOLF HECK.